United States Patent
Ortega Gomez et al.

(10) Patent No.: US 11,067,202 B2
(45) Date of Patent: Jul. 20, 2021

(54) PUZZLE-LOCK PIPE MOUNT ASSEMBLY

(71) Applicant: GM GLOBAL TECHNOLOGY OPERATIONS LLC, Detroit, MI (US)

(72) Inventors: Edgar Israel Ortega Gomez, Lerma (MX); Jaen Misael Arizmendi Carvajal, Coyoacan (MX); Hector Chavez Hernandez, Barrio de Santa Maria (MX)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/721,055

(22) Filed: Dec. 19, 2019

(65) Prior Publication Data
US 2021/0190238 A1 Jun. 24, 2021

(51) Int. Cl.
*F16L 3/223* (2006.01)
*F16L 3/10* (2006.01)
*F16L 3/22* (2006.01)
*F16L 3/12* (2006.01)

(52) U.S. Cl.
CPC .............. *F16L 3/2235* (2013.01); *F16L 3/10* (2013.01); *F16L 3/1211* (2013.01); *F16L 3/1215* (2013.01); *F16L 3/222* (2013.01)

(58) Field of Classification Search
CPC ......... F16L 3/2235; F16L 3/10; F16L 3/1211; F16L 3/1215; F16L 3/222; F16L 3/237; F16L 3/223; F16L 3/22; F16L 3/1075; F16L 5/00; B60R 16/08; B60R 16/02; B60R 16/0207; B60R 16/0215; B60R 16/0222
USPC ...................... 248/67.7, 67.5, 68.1
See application file for complete search history.

(56) References Cited

U.S. PATENT DOCUMENTS

| 5,271,646 | A | * | 12/1993 | Allread | F16L 41/086 285/124.2 |
| 9,114,687 | B2 | * | 8/2015 | Dorland | B60H 1/00571 |
| 2006/0001261 | A1 | * | 1/2006 | Miyajima | B60R 16/0222 285/136.1 |
| 2017/0314705 | A1 | * | 11/2017 | Krohn | F16L 3/2235 |
| 2017/0314706 | A1 | * | 11/2017 | Krohn | B60R 16/08 |

* cited by examiner

Primary Examiner — Christopher Graft
(74) Attorney, Agent, or Firm — Quinn IP Law

(57) ABSTRACT

A carrier assembly for a plurality of pipes includes a block and a keeper plate. The block has pipe holes defined therein, which are configured to receive the pipes. A slot is angular to the pipe holes. The keeper plate has a planar member and open channels formed therethrough, which are configured to partially surround the pipes. A lock member on the keeper plate interfaces the slot in the block. The keeper plate is moveable between an unlocked position, where the lock member is outside of the slot of the block and the open channels are not aligned with the pipe holes of the block; and a locked position, rotated relative to the unlocked position, where the lock member of the keeper plate is within the slot of the block, and the open channels of the keeper plate are aligned with the pipe holes of the block.

12 Claims, 2 Drawing Sheets

PUZZLE-LOCK PIPE MOUNT ASSEMBLY

INTRODUCTION

The present disclosure relates to mechanisms and assemblies for transporting and assembling pipes or tubes for carrying fluids to and from components.

SUMMARY

A carrier or carrier assembly for transporting and installing a plurality of pipes is provided. The carrier includes a block having a plurality of pipe holes defined therein. The pipe holes are configured to receive at least a portion of the pipes. The block also has a slot that is angular to the pipe holes.

The carrier also includes a keeper plate having a planar member and a plurality of arms extending from the planar member. The arms define open channels through the planar member, and the open channels are configured to partially receive the pipes. The keeper plate also has a lock member that is configured to interface with a portion of the slot in the block.

The keeper plate is moveable, relative to the block, between an unlocked position and a locked position. In the unlocked position, the lock member of the keeper plate is outside of the slot of the block, and the open channels of the keeper plate are not aligned with the pipe holes of the block. In the locked position, which is rotated relative to the unlocked position, the lock member of the keeper plate is within the slot of the block, and the open channels of the keeper plate are aligned with the pipe holes of the block.

In some configurations of the carrier, the lock member of the keeper plate has a ledge offset from the planar member, and the slot of the block includes a recessed groove configured to receive the ledge of the lock member. Therefore, there is a positive locking relationship between the ledge and the slot when the keeper plate is in the locked position.

The carrier may also include a ledge formed in the pipe holes of the block, and a flange extending circumferentially from each of the pipes. The flange contacts the ledge, such that the pipe is prevented from moving beyond the block in a first direction. Additionally, the arms of the keeper plate may contact the flange of the pipe opposite the ledge, such that the pipe is prevented from moving beyond the block in a second direction that is opposite the first direction.

In some configurations of the carrier, the block includes at least three pipe holes, and the keeper plate includes at least three open channels. The keeper plate may be formed from one of polyamide and metal. In some configurations of the carrier, a bolt hole is defined through the keeper plate and through the block, and a bolt passes through the bolt hole to attach the keeper plate and the block to a component into which the pipes extend.

The above features and advantages and other features and advantages of the present disclosure are readily apparent from the following detailed description of the best modes for carrying out the disclosure when taken in connection with the accompanying drawings.

DETAILED DESCRIPTION

Figure 1:
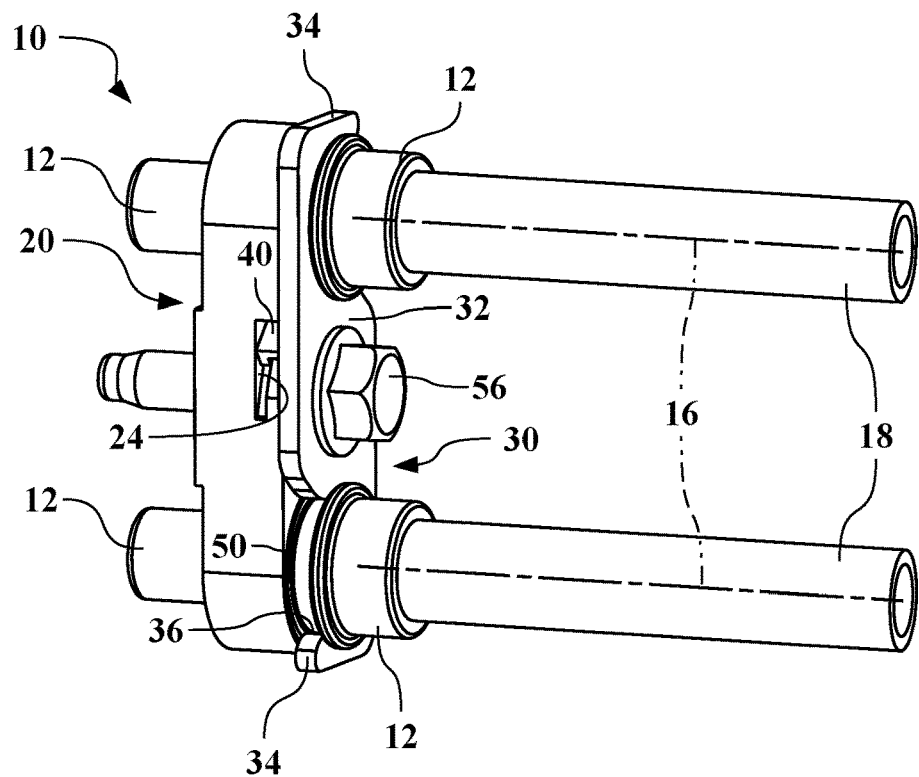
FIG. 1 is a schematic isometric view of one embodiment of a puzzle-lock carrier assembly for connecting pipes to components, shown with a keeper plate in a locked position relative to a block.
Figure 2:
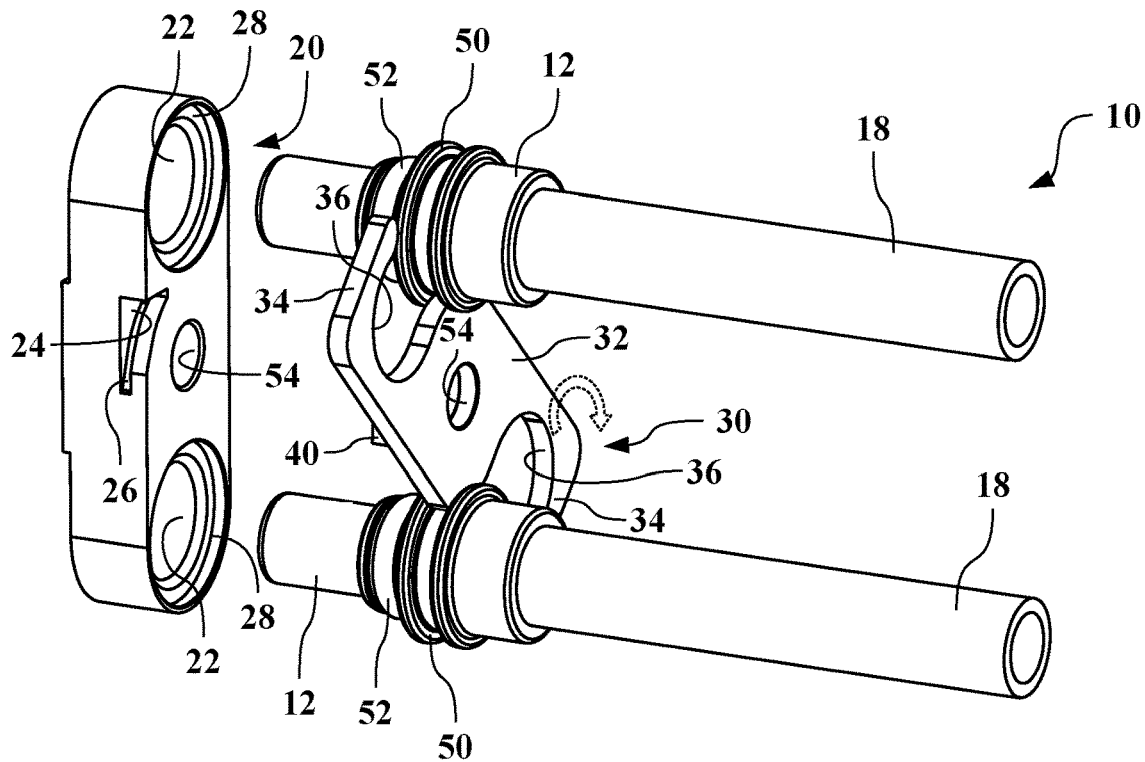
FIG. 2 is a schematic exploded isometric view of one embodiment of a puzzle-lock carrier assembly, shown with the keeper plate in an unlocked position relative to the block.
Figure 3:
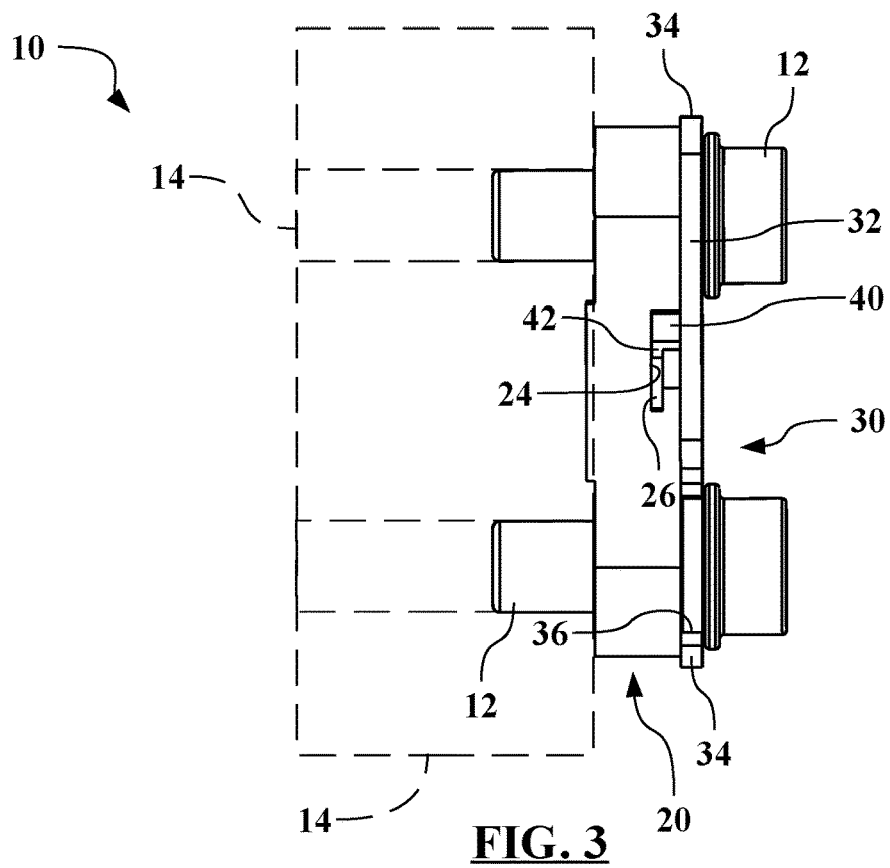
FIG. 3 is a schematic side view of one embodiment of a puzzle-lock carrier assembly, shown in a locked position.

Referring to the drawings, like reference numbers refer to similar components, wherever possible. FIG. 1 schematically illustrates a carrier assembly or carrier 10 in a locked position. The carrier 10 may be used for transporting and installing a plurality of pipes 12 to a component 14, such as an electric drive motor or transmission. FIG. 2 shows an exploded view of the carrier 10 in an unlocked position, and FIG. 3 shows a side view of the carrier 10 aligned relative to the component 14, which is shown highly schematically with dashed lines.

As best viewed in FIG. 1, each of the pipes 12 generally defines an axis 16, and a plurality of conduits or tubes 18 extend from the pipes 12. The pipes 12 and tubes 18 may be used to carry fluids—including, without limitation, oil, water, or coolant—from the component 14 to other systems, including radiators or coolers.

Note that the tubes 18 shown in the figures extend largely straight relative to the axes 16 of the pipes 12. However, in most configurations of actual usage, the tubes 18 may be curved, and may begin to curve or angle relatively near the pipes 12. Furthermore, note that in many configurations, the pipes 12 and the tubes 18 will be attached or may be considered a single component. Additionally, the pipes 12 and the tubes 18 may be flexible or substantially rigid. The tubes 18 are not depicted in FIG. 3.

The drawings and figures presented herein are not to scale and are provided purely for instructional purposes. Thus, any specific or relative dimensions shown in the drawings are not to be construed as limiting.

While the disclosure may be illustrated with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

When used herein, the term "substantially" refers to relationships that are ideally perfect or complete, but where manufacturing realties prevent absolute perfection. Therefore, substantially denotes typical variance from perfection. For example, if height A is substantially equal to height B, it may be preferred that the two heights are 100.0% equivalent, but manufacturing realities likely result in the distances varying from such perfection. Skilled artisans would recognize the amount of acceptable variance. For example, and without limitation, coverages, areas, or distances may generally be within 10% of perfection for substantial equivalence. Similarly, relative alignments, such as parallel or perpendicular, may generally be considered to be within 5%.

The carrier 10 generally includes two elements or components for transporting, aligning, and installing the pipes 12 relative to the component 14. The first component is a block 20. As best viewed in FIG. 2, a plurality of pipe holes 22 are defined in the block 20, and are configured to receive a portion of the pipes 12.

The block 20 has a slot 24 formed therein, which is angular to the pipe holes 22 and to the axes 16 of the pipes 12. The slot 24 of the block 20 includes a recessed groove 26, such that the slot 24 forms a portion of the puzzle-lock interface of the carrier 10. A ledge 28 may be formed in the pipe holes 22 of the block 20, and is configured to interact with a portion of the pipes 12.

The slot 24 is configured to interact with the other component of the carrier 10, a keeper plate 30, when the carrier 10 is in the locked position. The keeper plate 30 includes a planar member 32 and a plurality of arms 34 extending outward therefrom. The arms 34 define a plurality of open channels 36 through the planar member 32. As shown in FIG. 1, the open channels 36 are configured to partially receive and surround the pipes 12.

Figure 4:
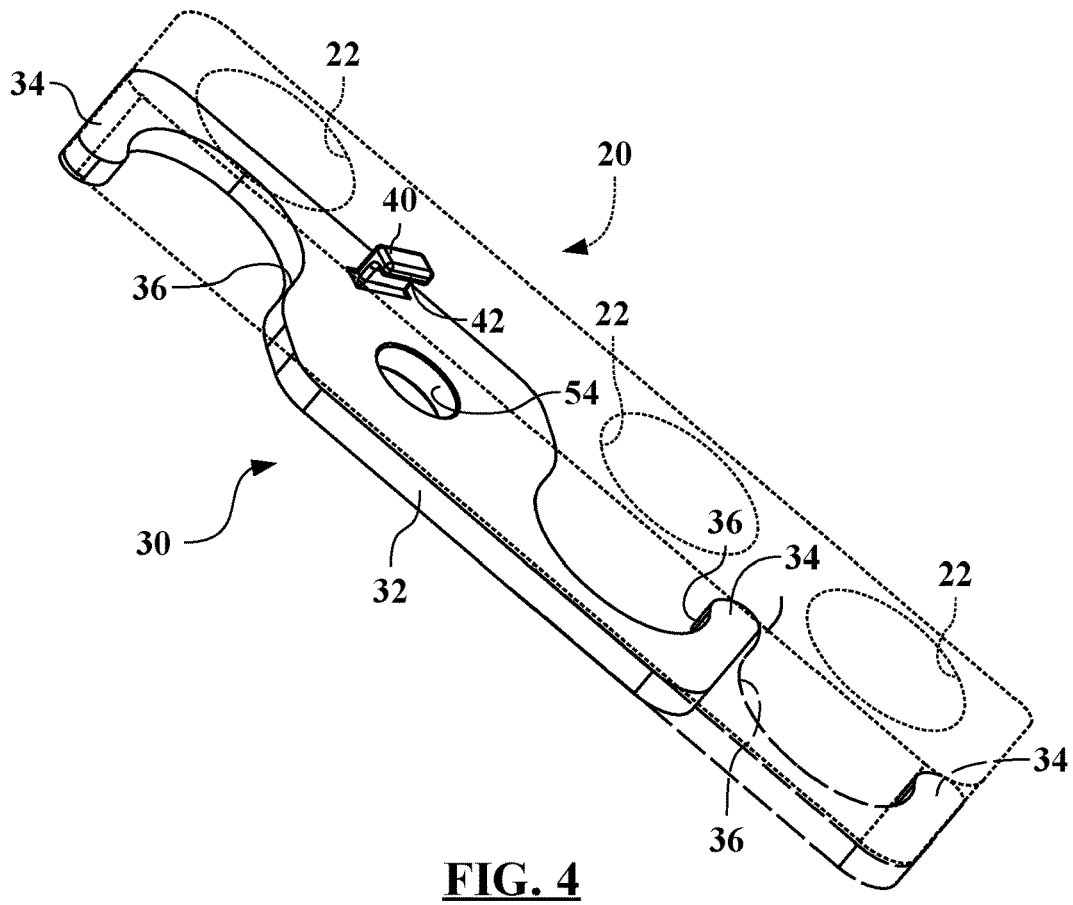
FIG. 4 is a schematic isometric view of one embodiment of a keeper plate that operates as part of a carrier assembly, illustrating a portion of the puzzle-lock features, and illustrating additional features for additional pipes.

Referring also to FIG. 4, and with continued reference to FIGS. 1-3, there is shown an underside view of the keeper plate 30. As best viewed in FIG. 4, a lock member 40 extends away from the planar member 32 and is configured to interface, in a puzzle-lock fashion, with a portion of the slot 24 in the block 20. The lock member 40 of the keeper plate 30 has an overhanging shelf, or shelf 42, which is offset from the planar member 32 and or cantilevered from the remainder of the lock member 40.

The lock member 40 of the keeper plate 30 interfaces with the slot 24 of the block 20 to selectively place the carrier 10 into the locked position by moving the keeper plate 30 relative to the block 20. The slot 24 is shown formed along an edge of the block 20, but could be machined or formed in different configurations, such as a drop-in hole or slot from the face of the block 20.

The keeper plate 30 is moveable, relative to the block 20, between the unlocked position and the locked position. In the unlocked position (shown in FIG. 2), the lock member 40 of the keeper plate 30 is outside of the slot 24 of the block 20, and the open channels 36 of the keeper plate 30 are not aligned with the pipe holes 22 of the block 20.

The locked position is rotated clockwise (as viewed in FIGS. 1 and 2) relative to the unlocked position. In the locked position (shown in FIGS. 1 and 3), the lock member 40 of the keeper plate 30 is within the slot 24 of the block 20, and the open channels 36 of the keeper plate 30 are aligned with the pipe holes 22 of the block 20, such that the open channels 36 at least partially surround the pipes 12.

In the locked position, the keeper plate 30 is not separable from the block 20 in the direction of the axes 16, and the pipes 12 are not separable form the block 20. In order to separate the keeper plate 30 from the block 20, an operator would need to rotate the keeper plate 30 back to the unlocked position—counterclockwise, as viewed in FIGS. 1 and 2.

As best viewed in FIGS. 3 and 4, the overhanging shelf 42 of the lock member 40 is offset from the planar member 32. In the locked position, the shelf 42 extends into the slot 24 of the block 20, and interfaces with the recessed groove 26.

There is an overlapping, positive lock between the shelf 42 and the recessed groove 26. Therefore, there is a puzzle-lock interaction between the shelf 42 of the lock member 40 and the recessed groove 26 of the block 20, when the keeper plate 30 is in the locked position.

The carrier 10 is configured to retain and align the pipes 12 for eventual assembly and insertion of the pipes 12 to the component 14. The ledge 28 is formed within the pipe holes 22 of the block 20. At least one flange 50 extends circumferentially from each of the pipes 12. As the pipes 12 are placed into the block 20, the flange 50 contacts the ledge 28, such that the pipes 12 are prevented from moving beyond the block 20 in a first direction through the block 20 (generally leftward, as viewed in FIGS. 1-3).

Additionally, the arms 34 of the keeper plate 30 contact the flange 50 of the pipes 12 opposite the ledge 28. Therefore, the pipes 12 are prevented from moving beyond the block 20 in a second direction, away from the block 20 (generally rightward, as viewed in FIGS. 1-3) that is opposite the first direction. As shown in the figures, additional flanges may be formed on the pipes 12.

The pipes 12 may also include one or more seals 52, which prevent passage of fluids between the block 20 and the exterior of the pipes 12. Additionally, the seals 52 may assist in holding and aligning the pipes 12 within the pipe holes 22 until the keeper plate 30 is moved into the locked position and is capturing the pipes 12 within the carrier 10.

Assembly of the carrier 10 occurs, as viewed in progression from FIG. 2 to FIG. 1, by aligning the pipes 12 (and likely the tubes 18) to the pipe holes 22, and then inserting the pipes 12 into the block 20. Then, the keeper plate 30 may be moved between the pipes 12, while in the unlocked position, as shown in FIG. 2.

Pushing the keeper plate 30 into contact with the block 20 and rotating the keeper plate 30 clockwise (as viewed in FIG. 2) causes the lock member 40 to enter the slot 24. The open channels 36 partially surround the pipes 12 and restrain movement of the flange 50.

As the shelf 42 of the lock member 40 slides into the recessed groove 26 of the slot 24, the keeper plate 30 is locked to the block 20. As a result, the pipes 12 are not able to move in either direction along their respective axes 16. In many configurations, the pipes 12 may be able to rotate, depending on the interaction between the seals 52 and the pipe holes 22.

When the pipes 12 are assembled to the block 20 and the keeper plate 30 is in the locked position, the carrier 10 may be ready for shipment or transportation to an installation location, such as an assembly plant. If, for some reasons, either the pipes 12 or the tubes 18 are damaged during shipment, the keeper plate 30 may be unlocked by twisting the keeper plate 30 counterclockwise (as viewed in FIGS. 1 and 2), which allows one or more of the pipes 12 to be removed and replaced before re-locking the keeper plate 30.

At the installation facility, the carrier 10 is aligned with holes in the component 14, which are configured to match the alignment of the pipes 12 provided by the block 20. The component 14 may be, for example, and without limitation, a drive motor or transmission that communicates oil through the pipes 12 to another component configured to cool or warm the oil to a preferred operating temperature for the component 14.

There is at least one bolt hole 54 defined through the keeper plate 30 and/or the block 20. A bolt 56 passes through the bolt hole 54 and is configured to attach the keeper plate 30 and block 20 to the component 14, such that the pipes 12 extend at least partially into the component 14. Therefore, the carrier 10 is able to hold the pipes 12 in position, and relative protection, and then able to align the pipes 12 for insertion into the component 14.

In some configurations of the carrier 10, either the keeper plate 30 or the block 20 may be formed from polyamide, or another relatively hard plastic, or may be formed from metal. Note that the keeper plate 30 and the block 20 may be formed from the same material or from differing materials. In addition, the pipes 12 and the tubes 18 may be formed from either plastic or metal. The actual materials usable for any of the components of the carrier 10 will be apparent to skilled artisans.

FIG. 4 illustrates a view of the underside of the keeper plate 30. The figure illustrates how the overhanging or cantilevered shelf 42 extends from the remainder of the lock member 40 and forms a gap or slot between the lock member 40 and the planar member 32, such that the cantilevered shelf 42 forms an L-shaped lock member 40. Therefore, there is a positive locking—or puzzle-lock—interaction between the lock member 40 of the keeper plate 30 and the slot 24 of the block 20.

FIG. 4 also illustrates an alternative configuration of the keeper plate 30 that may be used with carriers 10 configured for additional pipes 12. In the configurations of the FIGS. 1-3, there are two pipes 12. However, FIG. 4 illustrates, in long dashed lines, a configuration that could incorporate up to three pipes 12, as there are additional open channels 36. The associated block 20 is illustrated, highly schematically, in short dashed lines, for the alternative configuration shown in FIG. 4 and includes three pipe holes 22, which run through the entirety thereof. The block 20 with three pipe holes 22 of FIG. 4 may contain any, and all, of the features shown in FIGS. 1-3.

In the configuration shown in FIG. 4, each of the three pipes 12 would be aligned in a substantially linear fashion. However, the pipes 12, and pipe holes 22 in the associated block 20, need not be linear, as long as the keeper plate 30 is able to move from an unlocked position into a locked position and retain the pipes 12 within the respective open channels 36. Note that additional pipes 12 (four, or more) could be incorporated into the carrier 10 without altering the general configuration shown.

The detailed description and the drawings or figures are supportive and descriptive of the subject matter herein. While some of the best modes and other embodiments have been described in detail, various alternative designs, embodiments, and configurations exist.

Furthermore, any embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A carrier assembly, comprising:
a plurality of pipes having a flange extending circumferentially from each of the pipes;
a block, having:
a plurality of pipe holes defined therein, configured to receive a portion of the pipes;
a ledge formed in the pipe holes of the block; and
a slot, angular to the pipe holes;
a keeper plate, having:
a planar member;
a plurality of arms defining a plurality of open channels through the planar member, wherein the open channels are configured to partially receive the pipes; and
a lock member configured to interface with a portion of the slot in the block;
wherein the keeper plate is moveable, relative to the block, between:
an unlocked position, in which the lock member of the keeper plate is outside of the slot of the block, and the open channels of the keeper plate are not aligned with the pipe holes of the block, and
a locked position, rotated relative to the unlocked position, in which the lock member of the keeper plate is within the slot of the block, and the open channels of the keeper plate are aligned with the pipe holes of the block;
wherein the lock member of the keeper plate has a shelf offset from the planar member and cantilevered from a remainder of the lock member, such that the lock member forms: an L-shape, and wherein the slot of the block includes a recessed groove configured to receive the shelf of the lock member, when the keeper plate is in the locked position; and
wherein the flange of the pipes contacts the ledge of the block, such that the pipes are prevented from moving beyond the block in a first direction, and wherein the arms of the keeper plate contact the flanges of the pipes opposite the ledge, such that the pipes are prevented from moving beyond the block in a second direction, opposite the first direction.

2. The carrier assembly of claim 1,
wherein the block includes at least three pipe holes, and
wherein the keeper plate includes at least three open channels.

3. The carrier assembly of claim 2, wherein the keeper plate is formed from one of polyamide and metal.

4. The carrier assembly of claim 2, further comprising:
a bolt hole defined through the keeper plate and through the block; and
a bolt passing through the bolt hole and configured to attach the keeper plate and the block to a component into which the pipes extend.

5. A carrier assembly for a plurality of pipes, comprising:
a block, having:
a plurality of pipe holes defined therein, configured to receive the pipes; and
a slot, angular to the pipe holes;
a keeper plate, having:
a planar member;
a plurality of open channels formed through the planar member, wherein the open channels are configured to partially surround the pipes; and
a lock member configured to interface with a portion of the slot in the block;
wherein the keeper plate is moveable, relative to the block, between:
an unlocked position, in which the lock member of the keeper plate is outside of the slot of the block, and the open channels of the keeper plate are not aligned with the pipe holes of the block, and
a locked position, rotated relative to the unlocked position, in which the lock member of the keeper plate is within the slot of the block, and the open channels of the keeper plate are aligned with the pipe holes of the block; and wherein the lock member of the keeper plate has a cantilevered shelf offset from the planar member forming an L-shape on the lock member, such that the cantilevered shelf interfaces with the slot and prevents separation of the block and the keeper plate in an axial direction of the pipes.

6. The carrier assembly of claim 5, wherein the slot of the block includes a recessed groove configured to receive the cantilevered shelf of the lock member, when the keeper plate is in the locked position, such that the cantilevered shelf and the recessed groove form a positive lock.

7. The carrier assembly of claim 6, further comprising:
a bolt hole defined through the keeper plate and through the block; and
a bolt passing through the bolt hole and configured to attach the keeper plate and the block to a component into which the pipes extend.

8. The carrier assembly of claim 7,
wherein the block includes at least three pipe holes, and
wherein the keeper plate includes at least three open channels.

9. The carrier assembly of claim 8, wherein one of the keeper plate and the block is formed from polyamide.

10. The carrier assembly of claim 5, further comprising:
a ledge formed in the pipe holes of the block;
a flange extending circumferentially from each of the pipes, wherein the flange contacts the ledge, such that the pipes are prevented from moving beyond the block in a first axial direction of the pipes;
wherein the arms of the keeper plate contact the flanges of the pipes opposite the ledge, such that the pipes are prevented from moving beyond the block in a second direction, axial direction of the pipes, opposite the first axial direction.

11. The carrier assembly of claim 1, wherein the first direction is a first axial direction relative to the pipes, and the second direction is a second axial direction relative to the pipes.

12. The carrier assembly of claim 1, wherein the pipe holes defined in the block are configured to completely surround the pipes.

* * * * *